D. Dick,
Making Capsules.
N° 49,242    Patented Aug. 8, 1865.

Witnesses;
Wm Freuen
Theo Fusch

Inventor;
D Dick

UNITED STATES PATENT OFFICE.

DUNDAS DICK, OF NEW YORK, N. Y.

IMPROVEMENT IN THE MANUFACTURE OF CAPSULES.

Specification forming part of Letters Patent No. 49,242, dated August 8, 1865.

*To all whom it may concern:*

Be it known that I, DUNDAS DICK, of the city, county, and State of New York, have invented a new and useful Improvement in the Manufacture of Capsules; and I do hereby declare that the following is a full, clear, and exact description thereof, which will enable others skilled in the art to make and use the same, reference being had to the accompanying drawings, forming part of this specification.

The present invention relates more particularly to the molds in which the capsules are formed, and consists in the use of a fixed center core or plug made of any suitable kind of metal or other material, and of the desired or usual shape generally adopted in the manufacture of capsules, which center core is entirely surrounded by and incased in two similar side pieces, hinged to a common bed-plate so as to be swung away therefrom or closed upon it as may be desired, in the contiguous or contact faces of each of which are similar depressions, corresponding in shape to one-half of the exterior of the core, but of a little larger size, so that when the side pieces are closed around and about the same there shall be an equal and continuous, but narrow, open space entirely surrounding the core, to which space communication is then had through a suitable opening in the top portion of the two side pieces, whereby by pouring the ordinary gelatinous composition of which capsules are formed into the said opening it entirely pervades and fills the space about and around the center core, where it is allowed to remain until sufficiently cooled or hardened to retain its shape, but only to such a degree as will freely permit its withdrawal from the core or former, first, however, having opened the sides therefrom. The capsule is then filled with the desired composition or material and closed at its mouth by dipping it in the hot gelatine or other suitable material, as in the manufacture of capsules as heretofore practiced.

Figure 2:
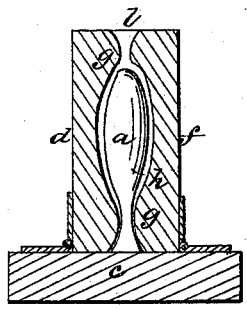
Figure 1:
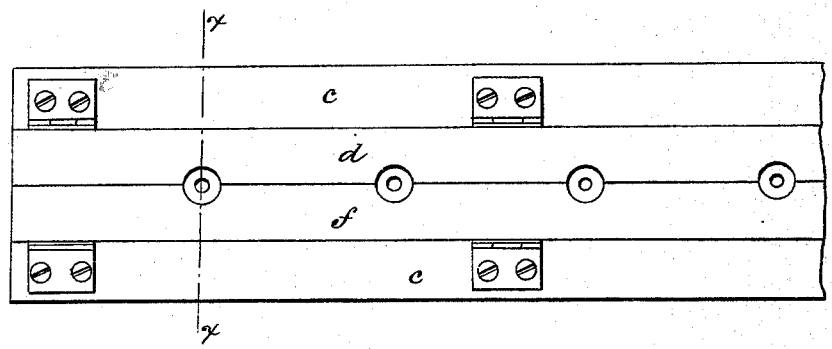

In the accompanying plate of drawings my improvement is illustrated, Figure 1 being a plan or top view of a mold, showing several apertures for communication with its interior; Fig. 2, a transverse vertical section taken in the plane of the line $x\, x$, Fig. 1.

$a\, a$ in the drawings represent the central core or plug, made of metal or other suitable material, and of the usual shape corresponding to the form of capsules as now manufactured, or of any other desired shape and size, and fixed by its smaller end in a vertical position to and upon a bed-plate, $c$.

$d$ and $f$ represent two side pieces hinged or otherwise suitably attached to the upper surface of the bed-plate, so as to be closed upon or opened from each other at pleasure, entirely incasing and surrounding the central core or plug $a$ when closed about the same. These side pieces have their contiguous faces or surfaces $g\, g$ similarly cut out or away corresponding in shape in each to one-half of the exterior surface of the core, but of little larger dimensions, so as to leave a small and narrow even space, $h$, entirely around the said core when they are closed upon the same, to which space communication is then had through the aperture $l$ in the top portion of each of the side pieces of the mold. A series of these center cores are attached to the one bed-plate and at any suitable distances apart, the contiguous faces of the common side pieces incasing and surrounding them being cut away at the proper points so as to form a chamber or space entirely around each, as before described.

When desired to form or mold capsules the central core and that portion of the surfaces of the side pieces surrounding the same are first coated with any suitable material—such as olive-oil—for preventing the adherence of the gelatinous composition to the same, after which the sides of the mold are closed upon each other and firmly clamped together by means of screws or any other suitable devices, when sufficient gelatinous composition as usually made is poured into the apertures to entirely fill the spaces between and around the central cores and their side pieces. It is then allowed to dry or cool to such a degree as to freely permit it to be drawn off of the central cores, first, however, having opened the sides of the mold from each other when they are thoroughly dried or hardened, and the composition or material with which it is intended to fill them is placed therein, after which their mouths are closed by simply dipping them in the hot gelatine or other suitable material for tightly sealing and closing them.

In lieu of hinging the side pieces of the mold to a bed-plate they may be otherwise arranged so as to open from and close upon each other, as is obvious, without further explanation.

From the above description it is apparent that a capsule of an even thickness throughout can be formed, the advantages of which are manifest, and also that they can be molded with great rapidity and facility.

I claim as new and desire to secure by Letters Patent—

In combination with the central core or plug, $a$, the detachable incasing or surrounding side mold-pieces, arranged together substantially as and for the purpose described.

The above specification of my invention signed by me this 16th day of June, 1865.

DUNDAS DICK.

Witnesses:
ALBERT W. BROWN,
M. M. LIVINGSTON.